(12) United States Patent
Zellermayer et al.

(10) Patent No.: US 9,582,373 B2
(45) Date of Patent: Feb. 28, 2017

(54) METHODS AND SYSTEMS TO HOT-SWAP A VIRTUAL MACHINE

(71) Applicant: VMware, Inc., Palo Alto, CA (US)

(72) Inventors: Gal Zellermayer, Ramat Hasharon (IL); Hilik Paz, Ramat Gan (IL); Avshi Avital, Sde Warburg (IL)

(73) Assignee: VMware, Inc., Palo Alto, CA (US)

( * ) Notice: Subject to any disclaimer, the term of this patent is extended or adjusted under 35 U.S.C. 154(b) by 185 days.

(21) Appl. No.: 14/231,036

(22) Filed: Mar. 31, 2014

(65) Prior Publication Data

US 2015/0278046 A1    Oct. 1, 2015

(51) Int. Cl.
*G06F 11/00* (2006.01)
*G06F 11/14* (2006.01)
*G06F 11/20* (2006.01)

(52) U.S. Cl.
CPC ...... *G06F 11/1484* (2013.01); *G06F 11/1438* (2013.01); *G06F 11/2028* (2013.01); *G06F 11/2094* (2013.01)

(58) Field of Classification Search
CPC ............. G06F 11/2023; G06F 11/2025; G06F 11/2028; G06F 11/2035; G06F 11/2046; G06F 11/1484; G06F 11/1438; G06F 11/2094; H04L 29/14
USPC ........................................................ 714/4.11
See application file for complete search history.

(56) References Cited

U.S. PATENT DOCUMENTS

| | | | | |
|---|---|---|---|---|
| 5,895,467 A | * | 4/1999 | Ubell | ...................... G06F 9/468 |
| 7,516,285 B1 | * | 4/2009 | Haynes | ............. G06F 17/30197 |
| | | | | 711/162 |
| 2005/0193245 A1 | * | 9/2005 | Hayden | ............... G06F 11/2069 |
| | | | | 714/13 |
| 2006/0174087 A1 | * | 8/2006 | Hashimoto | ........... G06F 9/5077 |
| | | | | 711/173 |

(Continued)

OTHER PUBLICATIONS

VMware, Inc., "What's New in VMware vSphere 5.5 Platform, version 1.3," downloaded from <http://www.vmware.com/files/pdf/vsphere/VMware-vSphere-Platform-Whats-New.pdf>, copyrighted 2013, 22 pages.

(Continued)

*Primary Examiner* — Yair Leibovich

(57) ABSTRACT

Methods and systems to limit the duration of a service interruption caused by a failed middleware application server are disclosed. One example method and system includes monitoring the operational status of a first virtual machine operating as a primary server and the operational status of a second virtual machine operating as a stand-by server and, based on the monitored operational status of the first and second virtual machines, performing a hot-swap to cause the second virtual machine to operate as the primary server and the first virtual machine to operate as the stand-by server. The first and second virtual machines are implemented on a same host processing system. After the hot-swap, the first virtual machine is restarted. In some examples, the first virtual machine and the second virtual machine are implemented on a same host processing system. Performing the hot-swap can include causing the first virtual machine to be uncoupled from a network and causing the second virtual machine to be coupled to the network. In some examples, the method also includes causing copy of a first file system used by the primary server to be stored as a second file system for use by the stand-by server.

19 Claims, 4 Drawing Sheets

(56) References Cited

U.S. PATENT DOCUMENTS

| | | | | |
|---|---|---|---|---|
| 2008/0155310 A1* | 6/2008 | Langen | G06F 11/2028 | 714/6.12 |
| 2008/0301673 A1* | 12/2008 | Kawasaki | G06F 9/45516 | 718/1 |
| 2009/0249284 A1* | 10/2009 | Antosz | G06F 8/10 | 717/104 |
| 2011/0179082 A1* | 7/2011 | Vaghani | G06F 17/30067 | 707/781 |
| 2012/0137006 A1* | 5/2012 | Minato | G06F 9/5083 | 709/226 |
| 2012/0311579 A1* | 12/2012 | Lee | G06F 9/45558 | 718/1 |
| 2013/0275808 A1* | 10/2013 | McNeeney | G06F 11/1482 | 714/20 |
| 2013/0290771 A1* | 10/2013 | Kim | G06F 11/1415 | 714/3 |
| 2015/0121122 A1* | 4/2015 | Towstopiat | G06F 11/1471 | 714/4.11 |

OTHER PUBLICATIONS

VMware, Inc., "Protecting Mission-Critical Workloads with VMware Fault Tolerance," downloaded from <http://www.vmware.com/files/pdf/resources/ft_virtualization_wp.pdf>, copyrighted 2009, 8 pages.

Sonasoft, "High Availability and Disaster Recovery for Exchange Servers Through a Mailbox Replication Approach," downloaded from <http://www.sonasoft.com/downloads/whitepapers/sonaexchange/SonaExchange-White-Paper-High-Availability-and-Disaster-Recovery-for-Exchange.pdf> on Mar. 31, 2014, 11 pages.

VMware Knowledge Base, "Sharing a Virtual Disk Between Multiple Virtual Machines (1002782)," downloaded from <http://kb.vmware.com/selfservice/microsites/search.do?language=en_US&cmd=displayKC&externalId=1002782> on Mar. 31, 2014, 2 pages.

VMware Knowledge Base, "VMware Fault Tolerance FAQ (1013428)," downloaded from <http://kb.vmware.com/selfservice/microsites/search.do?language=en_US&cmd=displayKC&externalId=1013428> on Mar. 31, 2014, 2 pages.

VMware, Inc., "VMware vSphere High Availability 5.0 Deployment Best Practices," Technical Marketing Documentation, updated Jan. 2013, 20 pages.

VMware, Inc., "What's New in VMware vSphere 5.1-Platform," Technical Marketing Documentation v 2.0, updated Jun. 2012, 13 pages.

Stalker Software, Inc., "Cluster Technology and File Systems," downloaded from <www.stalker.com/notes/SFS.html> on Mar. 31, 2014, copyrighted 2001-2004.

* cited by examiner

METHODS AND SYSTEMS TO HOT-SWAP A VIRTUAL MACHINE

FIELD OF THE DISCLOSURE

This disclosure relates generally to cloud computing systems, and more specifically, to hot-swapping a first virtual machine with a second virtual machine.

BACKGROUND

Cloud computing systems incorporate technologies to protect against software and hardware failures. For example, cloud providers seek to provide "high availability" of service to clients by minimizing the amount of downtime associated with a software or hardware failure. Technologies that provide high availability are typically used to protect systems that can tolerate at least brief interruptions of service. Cloud providers also seek to provide systems that offer "fault tolerance" by eliminating any and all downtime associated with software/hardware failures. Fault tolerance is typically used to protect systems that cannot tolerate any interruption of service or data loss (mission critical).

Both software and hardware redundancies are often built into cloud computing systems to provide protection against hardware/software failures. For example, in the event that a first virtual machine fails, traffic may be redirected from the first, failed virtual machine to a second, redundant virtual machine having a configuration identical to the first virtual machine. In some cases, the first and second virtual machines may have been load sharing prior to the failure. In other cases, the second virtual machine acts as a stand-by server that is in a powered off state until the failure of the first virtual machine is detected. In some examples, virtual machines are configured in clusters that are operating on different physical nodes and/or different physical locations. In this manner, a failure at one physical node and/or one physical location can be handled by hardware/software at another physical node/location. In some cases, a software failure on a virtual machine is handled with an attempted-restart of the crashed virtual machine.

A product to protect against hardware failure, called VMware® Fault Tolerance, uses a technology called vLockStep that guarantees that the state of a primary virtual machine operating on a first physical host processing system is the same as the state of a stand-by server operating on a different, second physical host processing system. The system operates by causing the primary and stand-by virtual machines to execute identical sets of x86 instructions. Both the primary and stand-by virtual machines process read/write operations in response to system inputs but the outputs of the stand-by virtual machine are suppressed so that only the output operations performed by the primary virtual machine take effect. When the primary virtual machine stops executing due to a hardware failure of the first host processing system, the outputs of the stand-by virtual machine of the second host processing system are no longer suppressed and the stand-by virtual machine becomes the primary in a manner that is transparent to system users.

DETAILED DESCRIPTION

Figure 1:
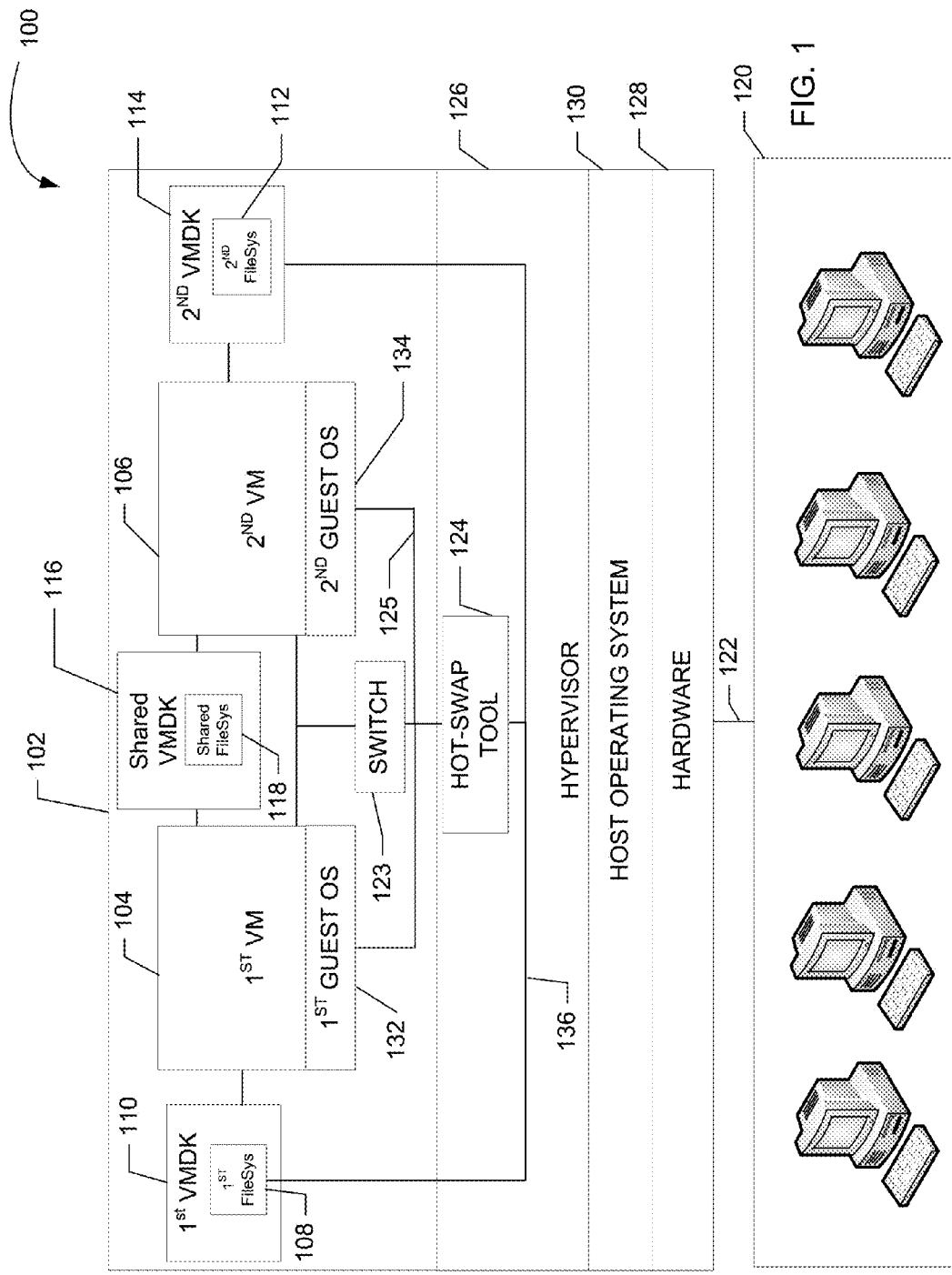
FIG. 1 is a block diagram of an example processing system having two example virtual machines that operate on a same physical host processor (also called a host processing system) and an example hot swap tool.

Cloud computing systems incorporate technologies to protect against software and hardware failures. For example, virtual machines operating on different physical servers are often configured in clusters to provide failover when one of the virtual machines (or servers) experiences a failure. In the event that a first virtual machine in a cluster fails, traffic may be redirected from the first, failed virtual machine to a second, redundant virtual machine in the cluster. In some cases, the first and second virtual machines may have been load sharing prior to the failure. In other cases, the second virtual machine acts as a stand-by server that is in a powered off state until the failure of the first virtual machine is detected. However, systems that use clustering solutions tend to be complex in that the system must be: 1) configured properly, 2) retain an up-to-date map of the, often complex, cluster configuration, 3) be equipped to identify available cluster servers having sufficient capacity at the time of fail over, reroute traffic as needed, etc. Further, in cases in which a software failure on a virtual machine is handled with an attempted restart of the crashed virtual machine, there can be a lag time of seconds and even minutes before the restart is successful.

The VMware® Fault Tolerance system uses a technology called vLockStep that guarantees that the states of a primary and a secondary (or backup) virtual machine are identical by having the primary and secondary virtual machines execute identical sets of x86 instructions. Both the primary and secondary virtual machines simultaneously process read/write operations in response to system inputs, but the outputs of the secondary virtual machine are suppressed so that only the output operations performed by the primary virtual machine take effect. When the primary machine fails, the outputs of the second virtual machine are no longer suppressed and the secondary virtual machine becomes the primary. However, VMware® Fault Tolerance is only capable of protecting against a hardware failure and not a software failure because any failure occurring on the primary virtual machine that is caused by software will also occur on the secondary virtual machine due to the fact that both machines are executing the same instructions. Thus, the same software bug causing the primary virtual machine to fail will cause the secondary virtual machine to fail.

Example apparatus, methods and systems disclosed herein reduce, and potentially eliminate, the duration of a service interruption experienced by middleware service users when a virtual machine that provides the service is subject to a software failure. In some example methods and systems, the operational status of a first virtual machine operating as a primary server is monitored and the operational status of a second virtual machine operating as a stand-by server is monitored. The first and second virtual machines are implemented on a same host processing system, also referred to as a same physical processor and/or a same microprocessor system. Based on the monitored operational status of the first and second virtual machines, a hot-swap is performed to cause the second virtual machine to operate as the primary server and the first virtual machine to operate as the stand-by server. After the hot-swap, the first virtual machine (e.g., the virtual machine that failed) is restarted. In some examples, the primary server has read/write access to a file system and the stand-by server has read-only access to the same file system. In some examples, performing the hot swap includes causing the first virtual machine to be uncoupled from a network and causing the second virtual machine to be coupled to the network. Further example methods cause copy of a first file system in a first virtual disk to be stored as a second file system in a second virtual disk, the first file system being used by the first virtual machine and the second file system disk being used by the second virtual machine. In some examples, performing the hot swap includes changing the file system access of the primary server from read/write to read-only and changing the file system access of the stand-by server from a read-only access to a read/write access.

Some example systems include a monitor to generate a notification when a first virtual machine acting as a primary server is not operational, a configuration tool to respond to the notification by performing a hot-swap operation that causes a second virtual machine to operate as the primary server and the first virtual machine to operate as a stand-by server, and a restart tool that causes the first virtual machine (e.g., the virtual machine that failed) to be restarted after the hot-swap operation. The example first and second virtual machines are implemented on a same host processing system. In some examples, the hot swap tool also includes a snapshot generator to generate a snapshot of a first file system associated with the primary server. The snapshot is used to construct an up-to-date version of the first file system, and the up-to-date version of the first file system is stored as a second file system in a virtual machine disk used by the stand-by server. In some examples, the hot swap tool configuration tool performs the hot-swap operation by causing the first virtual machine to become uncoupled from a network and the second virtual machine to be coupled to the network.

FIG. 1 is a block diagram of an example cloud processing system 100 having an example host processor 102 that supports an example first virtual machine ("the first VM") 104 and an example second virtual machine ("the second VM") 106. In some examples, the first VM 104 is implemented using a first file system 108 stored on an example first virtual machine disk 110 and the second VM 106 is implemented using an example second file system 112 stored on an example second virtual machine disk 114. In some examples, the second file system 112 is a copy of the first file system 108. In some examples, the first VM 104 and the second VM 106 share an example shared virtual machine disk 116 and both are implemented using a same example shared file system 118 stored thereon.

In some examples, the example host processor 102 is coupled to one or more other example processors 120 via an example network 122. An example software-implemented switch 123 allows either the example first VM 104 or the example second VM 106 to be coupled to the network 122 via, for example, the host processor 102. In some examples, the example first file system 108, and by default, the example second file system 112, both include an example middleware software application that, when executed, causes the first VM 104 or the second VM 106, depending on which is operational and coupled to the network 122, to provide middleware services to the processors 120 via the network 122. In some examples, the middleware software application is a database server application that causes the first VM 104 and the second VM 106 to operate as a database server. In such examples, one or more of the processors 120 operate as business servers that access the database servers.

In some examples, the example first VM 104 is coupled to the example network 122 via the switch 123 and operates as a primary server and the example second VM 106 is not coupled to the network 122 and operates as a stand-by server. In some such examples, an example hot-swap tool 124 installed on the example host processor 102 monitors the operation of the first VM 104 and the second VM 106 via a communication bus 125. If the hot swap tool 124 detects a failure of the primary server (e.g., the first VM 104), and further determines that the second VM 106 is operational, the hot-swap tool 124 causes the first VM 104 to be taken off the network and causes the second VM 106 to be placed onto the network (i.e., the first VM 104 and the second VM 106 are hot-swapped). After the first VM 104 and the second VM 106 are hot swapped, the second VM 106 becomes the primary server and the first VM becomes the secondary, stand-by server. In some examples, the hot-swap tool 124 is implemented by an example hypervisor 126 that also operates to abstract example processor hardware 128 that executes an example host operating system 130. The first VM 104 and the second VM 106 are implemented on top of the hypervisor 126 and each has a separate guest operating system 132 and 134, respectively, distinct from the host operating system 130. The first VM 104 and the second VM 106 need not be and, indeed, in the illustrated example, are not aware of the underlying processor hardware 128 or the host operating system 130. In this manner, the first VM 104 and second VM 106 operate as stand-alone servers that are isolated from each other and neither is aware that the other is implemented on the same host processor 102 (also referred to as a host processing system 102). In some examples, the first virtual machine disk 110 and the second virtual machine disk are coupled to the hot swap tool 124 via a communication bus 136.

Figure 2:
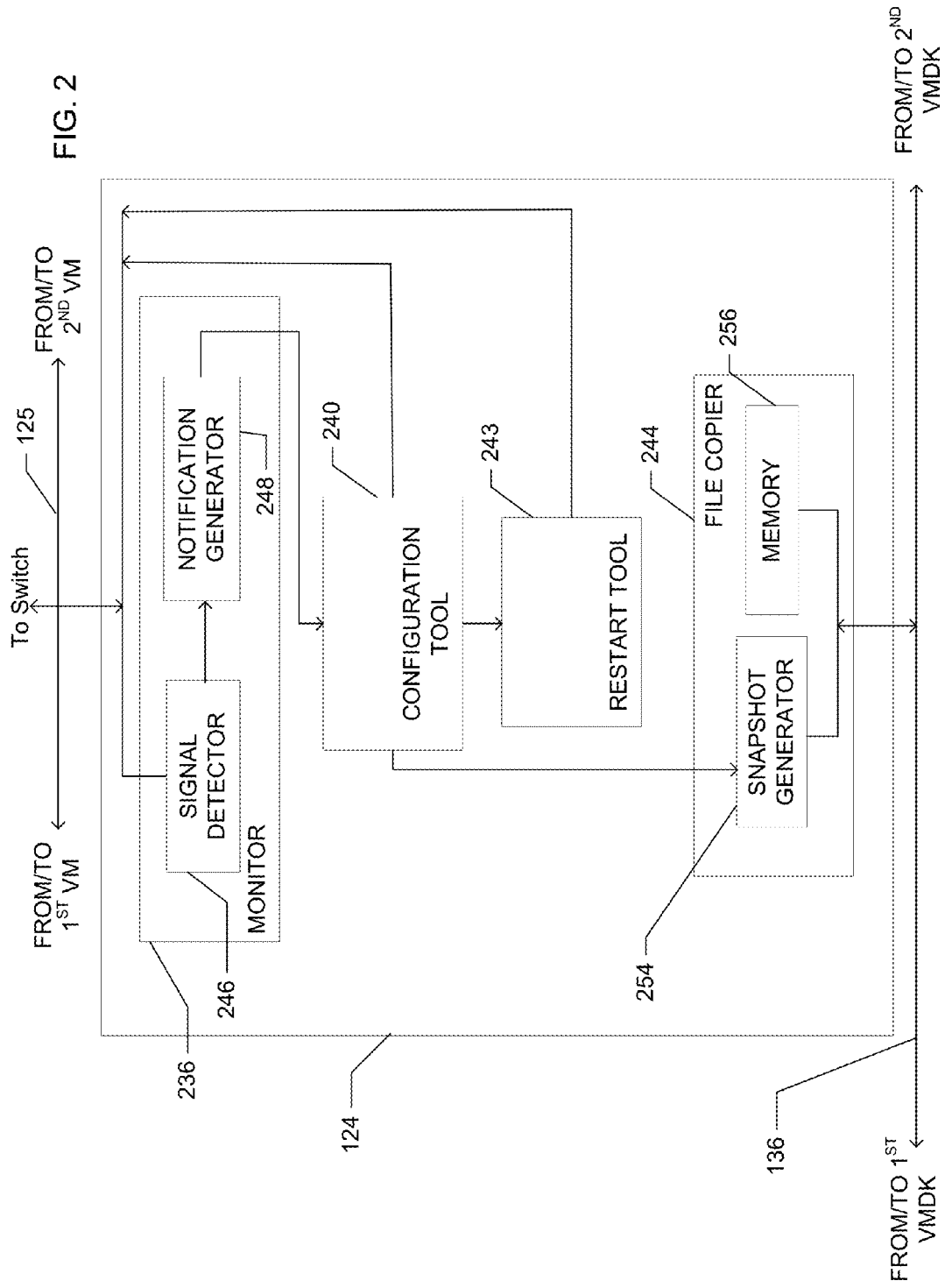
FIG. 2 is a block diagram of an example implementation of the example hot swap tool of FIG. 1.

FIG. 2 illustrates an example implementation of the example hot-swap tool 124 shown in FIG. 1. In some examples, the hot-swap tool 124 includes an example monitor 236 coupled, via the example communication bus 125, to the example first VM 104 and the example second VM 106, respectively. The hot-swap tool 124 further includes an example configuration tool 240 coupled, via the communication bus 125, to the example switch 123 (see FIG. 1) and/or to the first VM 104 and the second VM 106, and an example restart tool 243 also coupled to the communication bus 125. In some examples, the hot-swap tool 124 includes an example file copier 244 coupled to the example first virtual machine disk 110 and the example second virtual machine disk 114 via the communication bus 136. In some examples, the monitor 236 receives a first heartbeat signal from the example first VM 104 and receives a second heartbeat signal from the example second VM 106. In some examples, the first heartbeat signal is generated by the first VM 104 as a set of periodic (or aperiodic) heartbeat pulses and the second heartbeat signal is generated by the second VM 106 as a set of periodic (or aperiodic) heartbeat pulses. Provided that an example signal detector 246 implemented in the monitor 236 continues to receive a heartbeat pulse from the first VM 104 (when the first VM 104 is operating as the primary server), the monitor 236 takes no action. When the signal detector 246 fails to receive a heartbeat pulse from the first VM 104 within a threshold amount of time, the monitor 236 causes an example notification generator 248 to inform the configuration tool 240 that a hot-swap between the first VM 104 and the second VM 106 is to be performed. The configuration tool 240 responds to the information by causing the first VM 104 to be taken off the network 122 and the second VM 106 to be placed on the network 122 thereby causing the second VM 106 to become the primary server and the first VM 104 to become the stand-by server (i.e., the first VM 104 and the second VM 106 are hot-swapped). In some examples, the configuration tool 240 performs the hot-swap by causing the example switch 123 to move from a first position in which the first VM 104 is coupled to the network 122 and the second VM 106 is uncoupled from the network 122 to a second position in which the second VM 106 is coupled to the network 122 and the first VM 104 is uncoupled from the network 122. In some examples, the switch 123 moves from the first position to the second position by disassociating the first VM 104 with a first network address and associating the second VM 104 with the first network address. In some examples, before causing the switch 123 to operate, the monitor 236 verifies that the second VM 106 is still operational by determining whether the second VM 106 is still generating a heartbeat pulse. In some examples, when the second VM 106 is determined to be non-operational, the hot swap tool 124 can be designed to swap the first VM 104 with any number of other virtual machines configured in the same manner as the second VM 106. In some examples, the switch 123 is implemented in the configuration tool 240. The configuration tool 240 may take any desired action(s) to reroute traffic from the first VM 104 to the second VM 106.

After the hot-swap has occurred, the configuration tool 240 causes the example restart tool 243 to restart the virtual machine that failed (e.g., the first VM 104). In some examples, the restart tool is coupled to the first VM 104 and the second VM 106 via the communication bus 125. Upon restart, the first VM 104 remains in a stand-by mode until the primary server (e.g., the second VM 106) suffers a failure. The signal detector 246 continues to monitor the first and second heartbeat signals in the manner described above, until the second VM 106 fails to generate a heartbeat pulse within the threshold amount of time. When such a failure event occurs, the monitor 236 again causes the configuration tool 240 to perform the hot-swap operation, this time causing the second VM 106 to be taken off the network 122 and the first VM 104 to be placed on the network.

As described above, in some example implementations, the first file system 108 and the second file system 112 are initially identical. After system start-up, a file copier 244 periodically or aperiodically creates a copy of the example file system (e.g., the example first file system 108 or the example second file system 112) associated with the primary server (e.g., either the first VM 104 or the second VM 106, depending on which VM is coupled to the network 122) and uses the copy to replace the file system (e.g., the example first file system 108 or the example second file system 112) associated with the stand-by server (e.g., the VM that is not coupled to the network 122). In some examples, the file copier 244 supplies the copy of the file system to the stand-by server via the communication bus 136. In this manner, changes to the file system associated with the primary server are captured and copied to the file system used by the stand-by server thereby causing the first and second file systems to remain identical or nearly identical.

In some such example implementations, the example file copier 244 includes an example snapshot generator 254 and an example memory 256. The snapshot generator 254 generates a baseline snapshot of the file system associated with the primary server. In addition, the snapshot generator 254 periodically (or aperiodically) generates additional snapshots of the file system associated with the primary server. In some examples, the baseline and the subsequently generated snapshots are supplied to the second file system for storage. The stand-by server can use the most-recently generated snapshot and the baseline snapshot to construct an up-to-date version of the file system. In some examples, the snapshot generator 254 causes the baseline snapshot and the most-recently generated snapshot to be stored in the memory 256. The snapshot generator 254 can use the baseline snapshot and the subsequently generated snapshot(s) to construct an up-to-date version of the file system of the primary server and supply the up-to-date version of the file system to the virtual machine disk associated with the stand-by server for storage therein. In this manner, an identical copy of the file system of the primary server can be stored and used as the file system for the stand-by server at any desired point in time. Because the stand-by and the primary servers both have the same file system (e.g., by virtue of the copy operations, the file system associated with the stand-by machine is identical, or nearly identical, to the file system associated with the primary server), the stand-by server can be immediately and seamlessly swapped with the primary server. Moreover, if a software bug were to cause a failure of the primary server, the same software bug would not affect the stand-by server because the servers are not executing the same instructions in a lockstep fashion but are instead using the same file system.

In some examples, the example configuration tool 240 causes the example snapshot generator 254 to construct the most up-to-date version of the primary file system upon being notified that a hot-swap is to occur but before the hot-swap is performed. In some examples, the most-up-to-date version of the primary file system is constructed immediately after the hot-swap has occurred and before the newly swapped primary server begins processing requests from the servers 120 coupled to the network 122.

As further described above, in some example implementations, the example first VM 104 and the example second VM 106 share the example shared virtual machine disk 116 and, thus, share the example shared file system 118. In some such example implementations, the primary server and the stand-by server are both coupled to the example network 122 at the same time and the primary server is configured to operate in a read/write access mode and the stand-by server is configured to operate in a read-only access mode. When configured to share the shared file system 118 in this manner, the example configuration tool 240 can perform the hot-swap operation by changing the operational mode of the primary device from a read/write access mode to a read-only access mode and changing the operation of the stand-by device to a read-only access mode. Changing the primary server to a read-only access mode causes the primary server to become the stand-by server and changing the stand-by server to a read/write access mode causes the stand-by server to begin processing requests from the processors 120 coupled to the network 122 and thereby become the primary server. In some examples, the configuration tool 240 changes the operational mode of the primary and stand-by servers by changing one or more registers associated with the primary/stand-by servers. In some such examples, the example switch 123 is implemented using instructions that cause the operational mode registers to be altered.

In some such examples, the stand-by server operating in the read-only access mode is unable to see write operations performed after the most recent swap. In such examples before the read/write statuses are changed during a hot-swap operation, the example configuration tool 240 causes the stand-by server to mount and unmount the example shared virtual machine disk 116 thereby allowing the stand-by server to see the changes made to the example shared file system 118 (e.g., the changes made via write operations performed by the primary server).

In some examples, the example configuration tool 240 is adapted to cause the stand-by server to perform mount/unmount operations at prescribed intervals such that the secondary stand-by server is able to see the changes being made to the shared file system on a semi-continuous basis. Provided that an unmount/mount operation has been performed by the stand-by server within a threshold period of time before a hot-swap is to occur, another unmount/mount procedure need not be performed prior to the hot-swap. In some examples, the changes made to the example shared file system by the primary server are immediately readable by the second, stand-by server without need for performing an unmount/mount operation. In some examples, when the stand-by server is not operational at the time a hot-swap is to occur, the configuration tool 240 causes any number of other suitably configured virtual machines to become the primary server.

Thus, example hot-swap tools 124 disclosed herein provide a server, such as a middleware application server, with high availability by seamlessly and transparently swapping the primary server and the stand-by server when the primary server suffers a software failure. Because the stand-by server is operational at the time of the failure, the swap is performed without need to start the stand-by server or restart the primary server, thereby greatly reducing (and potentially eliminating) the amount of time that the middleware service is interrupted. Further, a software-induced failure of the primary server will not affect the secondary server because, at any given time, only the primary server is actively processing instructions while the stand-by server is limited to reading such instructions. As a result, the stand-by server that is hot-swapped in place of the primary server has not executed the offending instruction(s) that caused the crash and is thus, not subject to a failure/crash. In addition, because the stand-by server is not connected to the network, any crash to the primary server caused by too many clients (users) attempting to connect to the primary server, a malicious attack (e.g. SQL injection), a bug in the code related to handling client sessions, etc., would not cause the standby service to crash.

While an example manner of implementing the example processing system 100 and the example hot-swap tool 124 is illustrated in FIGS. 1 and 2, one or more of the elements, processes and/or devices illustrated in FIGS. 1 and 2 may be combined, divided, re-arranged, omitted, eliminated and/or implemented in any other way. Further, the example host processor 102, the example first VM 104, the example second VM 106, the example first file system 108, the example first virtual machine disk 110, the example second file system 112, the example second virtual machine disk 114, the example shared virtual machine disk 116, the example shared file system 118, the example processors 120, the example network 122, the example switch 123, the example hot swap tool 124, the example communication bus 125, the example hypervisor 126, the example hardware 128, the example host operating system 130, the example first guest operating system 132, the example second guest operating system 134, the communication bus 136, the example monitor 236, the example configuration tool 240, the example restart tool 243, the example file copier 244, the example signal detector 246, the example notification generator 248, the example snapshot generator 254, and/or the example memory 256, and/or, more generally, the processing system 100 of FIG. 1 may be implemented by hardware, software, firmware and/or any combination of hardware, software and/or firmware. Thus, for example, any of the example host processor 102, the example first VM 104, the example second VM 106, the example first file system 108, the example first virtual machine disk 110, the example second file system 112, the example second virtual machine disk 114, the example shared virtual machine disk 116, the example shared file system 118, the example processors 120, the example network 122, the example switch 123, the example hot-swap tool 124, the example communication bus 125, the example hypervisor 126, the example hardware 128, the example host operating system 130, the example first guest operating system 132, the example second guest operating system 134, the example communication bus 136, the example monitor 236, the example configuration tool 240, the example restart tool 243, the example file copier 244, the example signal detector 246, the example notification generator 248, the example snapshot generator 254, and/or the example memory 256, and/or, more generally, the example processing system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host processor 102, the example first VM 104, the example second VM 106, the example first file system 108, the example first virtual machine disk 110, the example second file system 112, the example second virtual machine disk 114, the example shared virtual machine disk 116, the example shared file system 118, the example processors 120, the example network 122, the example switch 123, the example hot swap tool 124, the example communication bus 125, the example hypervisor 126, the example hardware 128, the example host operating system 130, the example first guest operating system 132, the example second guest operating system 134, the example communication bus 136, the example monitor 236, the example configuration tool 240, the example restart tool 243, the example file copier 244, the example signal detector 246, the example notification generator 248, the example snapshot generator 254 and/or the example memory 256, are hereby expressly defined to include a tangible computer readable storage device or storage disk such as a memory, a digital versatile disk (DVD), a compact disk (CD), a Blu-ray disk, etc. storing the software and/or firmware. Further still, the example processing system 100 of FIG. 1 and the example hot-swap tool 124 of FIGS. 1 and 2 may include one or more elements, processes and/or devices in addition to, or instead of, those illustrated in FIGS. 1 and 2 and/or may include more than one of any or all of the illustrated elements, processes and devices.

Figure 3:
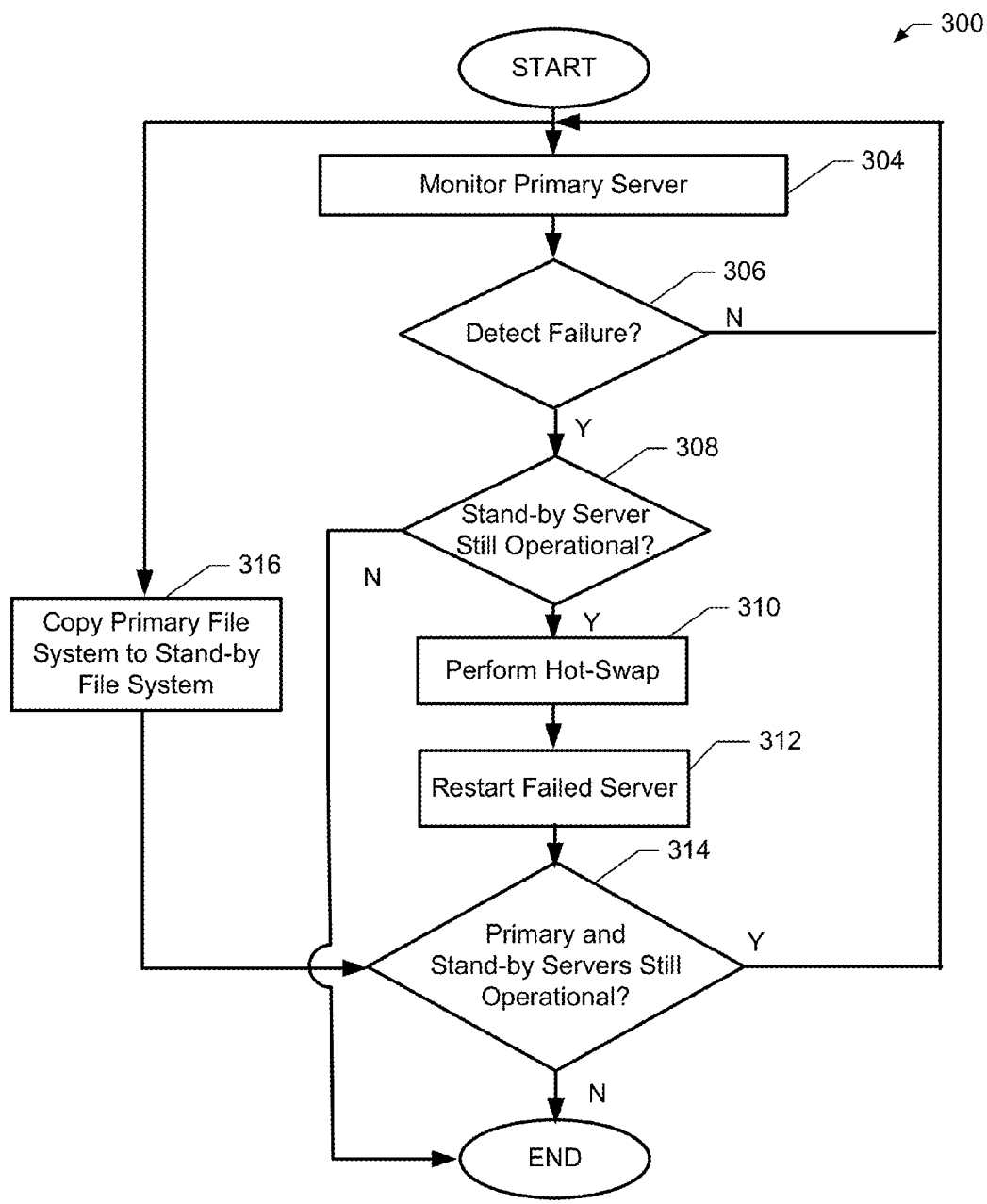
FIG. 3 is a flowchart representation of example machine readable instructions which may be executed to implement the example hot swamp tool of FIG. 1 and FIG. 2.

Flowcharts representative of example machine readable instructions for implementing the example hot swap tool of FIGS. 1 and 2 are shown in FIG. 3. In these examples, the machine readable instructions comprise a program for execution by a processor such as the processor 412 shown in the example processor platform 400 discussed below in connection with FIG. 4. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the hot-swap tool 124 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Example machine readable instructions that may be executed to implement the hot-swap tool of FIGS. 1 and 2 are represented by the flowchart 300 illustrated in FIG. 3. The example machine readable instructions 300 may be executed at intervals (e.g., predetermined intervals), based on an occurrence of an event (e.g., a predetermined event), etc., and/or any combination thereof. The example machine readable instructions represented by the flowchart 300 begin at a block 302. For descriptive purposes, when the flowchart begins at the block 302, the example first VM 104 (see FIG. 1) is operating as the primary server and the example second VM 106 (see FIG. 1) is operating as the stand-by server. However, in some examples, the second VM 106 may initially be operating as the primary server and the first VM 104 may be operating as the stand-by server.

At a block 304 the example signal detector 246 of the example monitor 236 begins monitoring the example first VM 104, and the example second VM 106. As determined at a block 306, provided that heartbeat pulses continue to be detected from the first VM 104 within prescribed intervals, the signal detector 246 continues monitoring the heartbeat pulses at the block 304. If the signal detector 246 fails to receive a heartbeat pulse from the first VM 104 within a prescribed interval, at a block 308, the example monitor 236 determines whether the second VM 106 is operational. In some examples, the monitor 236 determines the status of the second VM 106 at the signal detector 246 using the communication bus 125. If the monitor 236 determines that neither the first VM 104 nor the second VM 106 are operational, the flowchart ends.

At a block 310, the example configuration tool 240 responds to a failure notification from the example notification generator 248 by performing a hot-swap. Thus, the configuration tool 240 causes the primary server (e.g., the first VM 104) to be taken off the example network 122 and causes the stand-by server (e.g., the second VM 106) to be placed on the network 122 thereby causing the stand-by server to become the primary server (i.e., the first VM 104 and the second VM 106 are hot-swapped). In some examples, the example configuration tool 240 performs the hot-swap implemented at the block 310 by causing the example switch 123 to move from a first position in which the first VM 104 is coupled to the network 122 and the second VM 106 is uncoupled from the network 122 to a second position in which the second VM 106 is coupled to the network 122 and the first VM 104 is uncoupled from the network and 122. In some examples, the configuration tool 240 causes the switch 123 to move from the first position to the second position by disassociating the first VM 104 with a network address and associating the second VM 104 with the network address.

After the hot-swap has occurred, the example configuration tool 240 causes the example restart tool 243 to restart the failed virtual machine (e.g., the first VM 104) at a block 312. Upon restart, the primary server becomes the stand-by server (e.g., the first VM 104 becomes the stand-by server and the second VM 106 becomes the primary server). Provided that both the example first VM 104 and the example second VM 106 continue to be operational as determined at a block 314, control returns to the block 304 at which the example signal detector 246 continues to monitor the first and second heartbeat signals in the manner described above, until the second VM 106 fails to generate a heartbeat pulse within the threshold amount of time thereby indicating that second VM 106 has experienced a software crash. When such a failure event occurs the operations described with respect to the blocks 308-312 are performed again, this time causing the second VM 106 to be taken off the network 122 and the first VM 104 to be placed on the network. If, at the block 314, neither the first VM 104 nor the second VM 106 are operational, the method ends. In some examples, the operational status is determined at the block 314 via the signal detector 246 using the communication bus 125. Both the first VM 104 and the second VM 106 may not be operational for any number of reasons (e.g., the virtual machines are to be migrated, the virtual machines are no longer needed to provide services to the network, etc.).

In some examples, when the example first VM 104 and the example second VM 106 do not share the shared virtual machine disk 116, but are instead each operating using the example first file system 108 and the example second file system 112, respectively, the example file copier 244 creates a copy of the first file system 108 and causes the copy of the first file system 108 to be stored in the example second virtual machine disk 114 as the second file system 112. In some examples, the file copy operations are performed in a background process represented by a block 316.

In some examples, the file copy operations performed by the example file copier 244 at the block 316 involve causing the example snapshot generator 150 to generate snapshots of the file system associated with the primary server and causing the snapshots to be stored in a virtual machine disk used by the stand-by server. In some examples, a baseline snapshot of the first file system 108 is also stored in the virtual machine disk used by the stand-by server and the stand-by server uses the baseline snapshot and a most-recently (or more-recently) generated snapshot(s) to construct an up-to-date copy of the file system associated with the primary server. The up-to-date copy of the file system of the primary server is used to replace the file system of the stand-by server.

In some examples, the baseline snapshot and subsequently generated snapshot(s) are also stored in an example memory 256 associated with the example hot-swap tool 124 and the example file copier 244 is configured to construct the up-to-date version of the example first file system 108 using the snapshots. The background file copy operations continue to be performed until both the example first VM 104 and the example second VM 106 are no longer operational as determined at the block 314. The file copy operations of the block 316 is performed at a pace rapid enough to ensure that first and second file systems 108 and 112 remain identical or nearly identical.

As further described above, in some example implementations, the primary server (e.g., the first VM 104) and the stand-by server (e.g., the second VM 106) share the example virtual machine disk 116 and thus, share the example shared file system 118. In some such example implementations, the file copy operations represented by the block 316 are not performed and the hot-swap operation represented at the block 310 is performed by changing the access mode granted to the primary server and the stand-by server. In such example implementations, the primary server is initially configured to operate in a read/write access mode and the stand-by server is initially configured to operate in a read-only access mode. When configured in this manner, the hot-swap operation at the block 310 is performed by altering the access mode of the primary server from a read/write access mode to a read-only access mode and altering the access mode of the stand-by server from a read-only access mode to a read/write access mode.

In some examples, the stand-by server, when operating in a read-only access mode is unable to see the write operations performed by the primary server. In some such examples, before the read/write access modes are altered, the configuration tool 240 also causes the stand-by server to mount and unmount the shared virtual machine disk 116 thereby allowing the stand-by server to see the changes made to the example shared file system 118 by the primary server.

In some examples, the example hypervisor 126 is adapted to cause the stand-by server to perform mount/unmount operations at prescribed intervals such that the stand-by server is able to see the changes being made to the shared file system on an semi-continuous basis. Provided that an unmount/mount operation has been performed by the stand-by server within a threshold period of time before a hot-swap is to occur, another unmount/mount procedure need not be performed prior to the hot-swap. In some examples, the stand-by server is adapted to be able to see changes made to the shared file system 118 by the primary server without need for performing a mount/unmount operation.

Thus, the example hot-swap tool 124 of FIG. 1 and FIG. 2 operates within the processing system of FIG. 1 to: 1) determine that a primary server implemented by a virtual machine has experienced a software failure, 2) hot-swap the primary server with a stand-by server, and 3) restart the stand-by server. By performing the hot-swap operation in the event of a software failure, the service interruption time is greatly reduced compared to conventional software failure protection systems.

Figure 4:
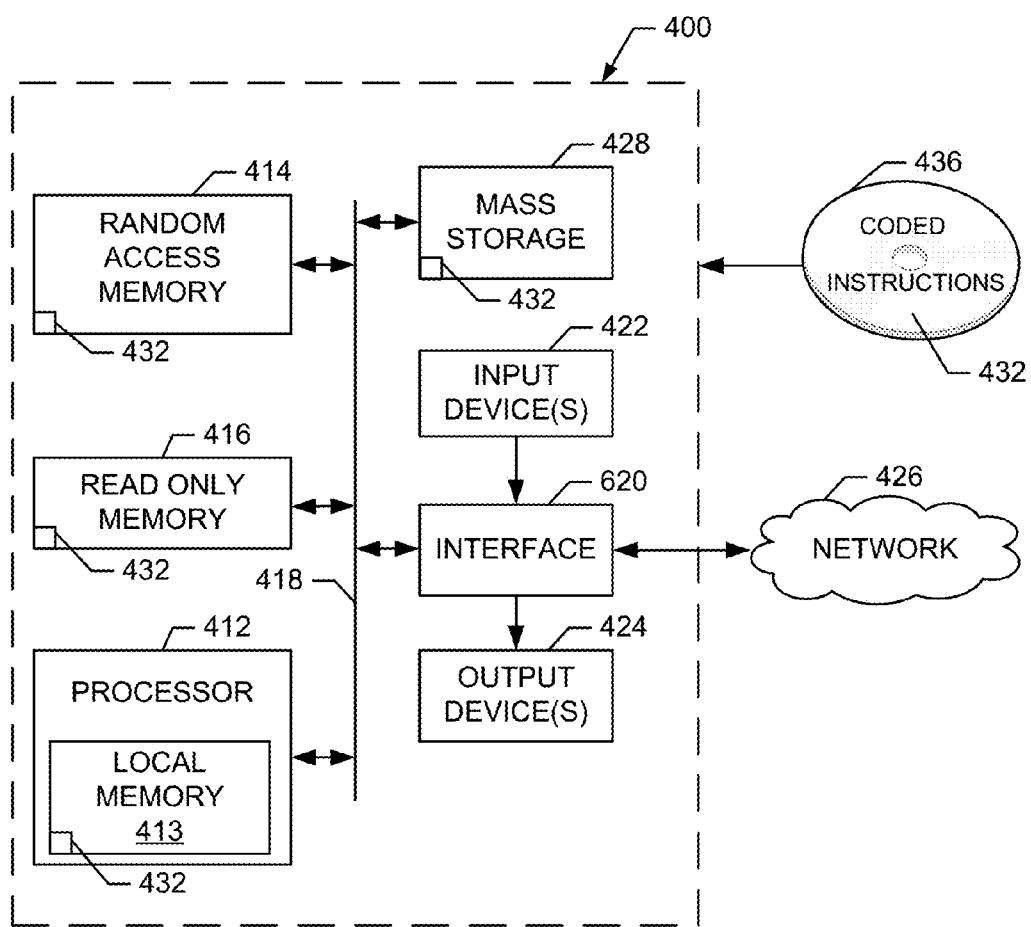
FIG. 4 is a block diagram of an example processing system that may execute the example machine readable instructions of FIG. 3 to implement the example processing system 100 and/or the example hot swap tool of FIG. 1.

FIG. 4 is a block diagram of an example processor platform 400 capable of executing the instructions of FIG. 3 to implement the apparatus of FIGS. 1 and 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

As an alternative to implementing the methods and/or apparatus described herein in a system such as the processing system of FIG. 4, the methods and/or apparatus described herein may be embedded in a structure such as a processor and/or an ASIC (application specific integrated circuit).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A method comprising:
monitoring, by executing an instruction with a processor, an operational status of a first virtual machine operating as a primary server and an operational status of a second virtual machine operating as a stand-by server, the first and second virtual machines being implemented on a same host processing system;
based on the monitored operational status of the first and second virtual machines, performing, by executing an instruction with the processor, a hot-swap to cause the second virtual machine to operate as the primary server and the first virtual machine to operate as the stand-by server, the hot-swap being performed by changing a file system access mode of the first virtual machine from a read/write access of a first file system to a read-only access of the first file system and changing a file system access mode of the second virtual machine from a read-only access of a second file system to a read/write access of the second file system, the first and second file systems having the same information, the secondary server being started prior to the hot-swap being initiated, and the hot-swap being performed without restarting the secondary server; and
restarting the first virtual machine.

2. A method as defined in claim 1, wherein the performing of the hot-swap includes causing the first virtual machine to be uncoupled from a network and causing the second virtual machine to be coupled to the network.

3. A method as defined in claim 1, further including, when the first virtual machine is operating as the primary server, causing a copy of the first file system used by the primary server to be stored as the second file system for use by the stand-by server.

4. A method as defined in claim 3, further including constructing, when the first virtual machine is operating as the primary server, the copy of the first file system using a first baseline snapshot of the first file system taken at a first time and a second snapshot of the first file system taken at a second time.

5. A method as defined in claim 1, wherein the first and second file systems are a same file system stored on a shared virtual machine disk.

6. A hot-swap tool comprising:
a monitor, implemented by a hardware processor, to generate a notification when a first virtual machine acting as a primary server is not operational;
a configuration tool, implemented by the hardware processor, to respond to the notification by performing a hot-swap operation to cause a second virtual machine to operate as the primary server and the first virtual machine to operate as a stand-by server, the first and second virtual machines being implemented on a same host processing system, the hot-swap being performed by changing a file system access mode of the primary server when implemented by the first virtual machine from a read/write access of a first file system to a read-only access of the first file system and changing a file system access mode of the stand-by server when implemented by the second virtual machine from a read-only access of a second file system to a read/write access of the second file system, the first and second file systems having the same information, the stand-by server being started prior to the hot-swap operation being initiated, and the hot-swap operation being performed without restarting the stand-by server; and
a restart tool to cause the first virtual machine to be restarted after the hot-swap operation.

7. A hot-swap tool as defined in claim 6, wherein the configuration tool is to perform the hot-swap operation by causing network traffic to be rerouted from the first virtual machine to the second virtual machine.

8. A hot-swap tool as defined in claim 6, wherein, before the monitor generates the notification, the primary server implemented by the first virtual machine has read/write access to the first file system and the stand-by server implemented by the second virtual machine has read-only access to the second file system.

9. A hot-swap tool as defined in claim 8, wherein the first and second file systems are a same file system stored on a virtual machine disk shared by the first and second virtual machines and the hot-swap operation includes changing the file system access mode of the primary server to a read-only access mode of the shared virtual machine disk and changing the file system access of the stand-by server to a read/write access mode of the shared virtual machine disk.

10. A hot-swap tool comprising:
a monitor, implemented by a hardware processor, to generate a notification when a first virtual machine acting as a primary server is not operational;
a configuration tool, implemented by the hardware processor, to respond to the notification by performing a hot-swap operation to cause a second virtual machine to operate as the primary server and the first virtual machine to operate as a stand-by server, the first and second virtual machines being implemented on a same host processing system, the hot-swap being performed by changing a file system access mode of the primary server when implemented by the first virtual machine from a read/write access of a first file system to a read-only access of the first file system and changing a file system access mode of the stand-by server when implemented by the second virtual machine from a read-only access of a second file system to a read/write access of the second file system, the first and second file systems having the same information, the stand-by server being started prior to the hot-swap operation being initiated, and the hot-swap operation being performed without restarting the stand-by server;
a restart tool to cause the first virtual machine to be restarted after the hot-swap operation; and
a snapshot generator to generate a snapshot of the first file system associated with the primary server, the snapshot to be used to construct an up-to-date version of the first file system, and the up-to-date version of the first file system to be stored as the second file system in a virtual machine disk used by the stand-by server.

11. A method comprising:
monitoring, by executing an instruction with a processor, an operational status of a first virtual machine operating as a primary server and an operational status of a second virtual machine operating as a stand-by server, the first and second virtual machines being implemented on a same host processing system;
generating a snapshot of a first file system associated with the primary server, the snapshot to be used to construct an up-to-date version of the first file system, and the up-to-date version of the first file system to be stored as the second file system in a virtual machine disk used by the stand-by server;
based on the monitored operational status of the primary server and the stand-by server, performing, by executing an instruction with the processor, a hot-swap to cause the second virtual machine to operate as the primary server and the first virtual machine to operate as the stand-by server, the hot-swap being performed by changing a file system access mode of the first virtual machine from a read/write access of a first file system to a read-only access of the first file system and changing a file system access mode of the second virtual machine from a read-only access of a second file system to a read/write access of the second file system, the first and second file systems having the same information, the secondary server being started prior to the hot-swap being initiated, and the hot-swap being performed without restarting the secondary server; and
restarting the first virtual machine.

12. A tangible machine readable non-transitory storage medium comprising instructions that, when executed, cause a machine to at least:
start a first virtual machine operating as a primary server and a second virtual machine operating as a stand-by server, the first and second virtual machines being implemented on a same host processing system;
generate a snapshot of a first file system associated with the primary server, the snapshot to be used to construct an up-to-date version of the first file system, and the up-to-date version of the first file system to be stored as a second file system in a virtual machine disk used by the stand-by server;
monitor operational status of the primary server and operational status of the stand\-by server;
based on the monitored operational status of the primary server and operational status of the stand-by server, and without restarting the stand-by server:
change a file system access mode of the primary server when implemented by the first virtual machine from a read/write access of the first file system to a read-only access of the first file system,
change a file system access mode of the stand-by server when implemented by the second virtual machine from a read-only access of the second file system to a read/write access of the second file system to cause the second virtual machine to act as the primary server, the first and second file systems having the same information; and
restart the first virtual machine to act as the stand-by server.

13. A tangible machine readable non-transitory storage medium comprising instructions that, when executed, cause a machine to at least:
start a first virtual machine operating as a primary server and a second virtual machine operating as a stand-by server, the first and second virtual machines being implemented on a same host processing system;
monitor operational status of the primary server and operational status of the stand-by server;
based on the monitored operational status of the primary server and the stand-by server, and without restarting the stand-by server:
change a file system access mode of the primary server when implemented by the first virtual machine from a read/write access of a first file system to a read-only access of the first file system,
change a file system access mode of the stand-by server when implemented by the second virtual machine from a read-only access of a second file system to a read/write access of the second file system to cause the second virtual machine to act as the primary server, the first and second file systems having the same information; and
restart the first virtual machine to act as the stand-by server.

14. A tangible machine readable storage medium as defined in claim 13, wherein the first file system used by the first virtual machine and the second file system used by the second virtual machine are a same file system.

15. A tangible machine readable storage medium as defined in claim 13, wherein the instructions further cause the machine to perform the hot-swap by causing the first virtual machine to be uncoupled from a network and causing the second virtual machine to be coupled to the network.

16. A tangible machine readable storage medium as defined in claim 13, wherein the instructions cause the machine to generate a snapshot of the first file system when the first virtual machine is operating as the primary server for use in constructing the second file system when the second virtual machine is operating as the stand-by server.

17. A tangible machine readable storage medium as defined in claim 13, wherein the first and second file systems used by the first and second virtual machines, respectively, are a same file system stored in a shared virtual machine disk.

18. A tangible machine readable storage medium as defined in claim 17, wherein the primary server and the stand-by server, when coupled to the network, provide a middleware service to a processor coupled to the network.

19. A tangible machine readable storage medium as defined in claim 13, wherein the first virtual machine uses a first file system stored in a first virtual machine disk, and the second virtual machine uses a second file system stored in a second virtual machine disk, the first file system and the second file system being a same file system.

* * * * *